United States Patent [19]

Knickel et al.

[11] 4,045,337

[45] Aug. 30, 1977

[54] ASYMMETRIC, SEMIPERMEABLE MEMBRANES OF CYCLIC POLYUREAS

[75] Inventors: Birger Knickel, Meerbusch; Hans Rudolph, Krefeld; Jürgen Hocker, Schildgen; Jürgen Lewalter, Cologne; Hans Jürgen Rosenkranz, Krefeld, all of Germany

[73] Assignee: Bayer Aktiengesellschaft, Germany

[21] Appl. No.: 589,950

[22] Filed: June 24, 1975

[30] Foreign Application Priority Data

June 28, 1974 Germany ............................ 2431071

[51] Int. Cl.$^2$ ...................... B01D 13/00; C08G 22/02
[52] U.S. Cl. .............................. 210/23 H; 210/500 M; 260/77.5 CH
[58] Field of Search ................. 210/23 H, 22, 500 M; 260/2.5 R, 2.5 N, 77.5 C, 77.5 CH

[56] References Cited

U.S. PATENT DOCUMENTS

| | | | |
|---|---|---|---|
| 3,228,877 | 1/1966 | Mahon | 210/500 M X |
| 3,423,491 | 1/1969 | McLain et al. | 210/500 M X |
| 3,503,939 | 3/1970 | Williams | 260/77.5 CH |
| 3,526,588 | 9/1970 | Michaels et al. | 210/500 M X |
| 3,630,999 | 12/1971 | Dimmig | 260/77.5 C |
| 3,752,784 | 8/1973 | Jenkins | 210/500 M X |
| 3,901,810 | 8/1975 | Brooks et al. | 210/500 M |

*Primary Examiner*—Thomas G. Wyse
*Assistant Examiner*—Robert H. Spitzer
*Attorney, Agent, or Firm*—Connolly and Hutz

[57] ABSTRACT

Asymmetric, semipermeable membranes of polyhydantoins or polyparabanates.

9 Claims, No Drawings

ASYMMETRIC, SEMIPERMEABLE MEMBRANES OF CYCLIC POLYUREAS

Asymmetric, semipermeable membranes of cellulose esters and polyamides have been successfully used for the desalination of sea water, for separating mixtures of substances and for concentrating fruit juices according to the principle of reverse osmoisis.

The membranes are produced by known methods, by dissolving the polymers in solvent mixtures of differing volatilities with the addition of swelling agents and pore forming agents and drawing or spraying the solution. While the membranes are still moist, they are made asymmetric by the partial evaporation of the more volatile solvent followed by coagulation in a precipitating bath. When produced in this way, the finished membrane has a relatively thin, active separating layer on the surface which has been directly exposed to the precipitating bath, and a porous supporting structure below this layer. Both flat membranes and hollow fibres produced in this way have good desalination properties and separating properties for substance mixtures under the pressure of reverse osmosis.

The asymmetric membranes previously used for the desalination of sea water by reverse osmosis were almost exclusively made of a cellulose esters and polyamides. In single stage desalination plants, these membranes have throughflow rates of 10 to 1000 l/m²d of desalinated water, with a salt retention capacity of 90 to 99.9% at an operating pressure of 40 to 120 atmospheres. The manufacture of such highly efficient asymmetric cellulose acetate membranes for the desalination of sea water has been described in U.S. Pat. No. 3,133,132. A report of asymmetric polyamide membranes with excellent separating properties is given in German Offenlegungsschrift No. 1,941,932. The membranes described, however, partly have only little resistance to hydrolysis, for example cellulose ester membranes under acid and alkaline conditions and polyamide membrance under acid conditions at pH values below 4.

Furthermore, cellulose ester membranes are generally sensitive to high pressures and high temperatures, which deleteriously and irreversibly alter their membrane properties.

The known membranes are therefore hardly suitable for the desalination of hot and acid effluent water.

It has now surprisingly been found that asymmetric membranes made of cyclic polyureas such as polyhydantoins and polyparabanates not only have excellent properties for the desalination of sea water, brackish water and effluent water and for concentrating and separating mixtures of substances but also have high thermal stability, pressure stability and resistance to hydrolysis in acid and alkaline pH ranges and particularly in a strongly acid medium at pH values of 0 to 4.

This invention therefore relates to asymmetric, semipermeable membranes of cyclic polyreas which are suitable for the desalination of sea water and for separating and concentrating mixtures of substances in an alkaline and acid medium, particularly a strongly acid medium.

The preparation of polyhydantoins has been described inter alia in German Offenlegungsschriften Nos. 1,494,443, and No. 1,570,552(U.S. Pat. No. 3,397,253) and of polyparabanates in German Offenlegungsschriften Nos. 1,720,744 (U.S. Pat. No. 3,547,896) 2,003,938 (U.S. Pat. No. 3,547,897) and 1,770,146 (U.S. Pat. No. 3,609,113). Suitable cyclic polyureas are compounds of the following general formulae:

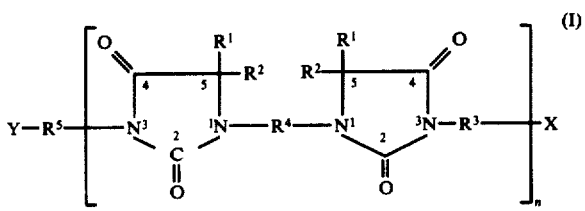

and

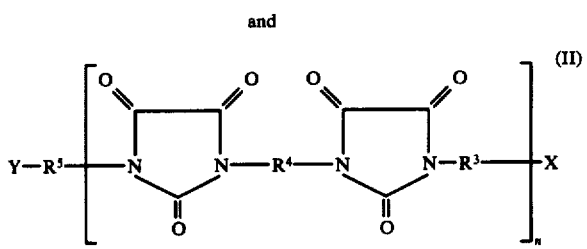

in which $R^1$ and $R^2$ which may be the same or different, represent hydrogen, $C_1$ to $C_6$ alkyl, $C_3$ to $C_6$ cycloalkyl or, together with the carbon atom in the 5-position, a cyclo-alkyl group containing 5 to 10 carbon atoms, but preferably a $C_1$ to $C_6$ alkyl group; and $R^3$ and $R^4$ which may be the same or different represent, $C_1$ to $C_{12}$ alkylene, $C_3$ to $C_6$ cyclo-alkylene, arylene such as phenylene or naphthylene; if desired, any or all of the groups may be connected to a group identical to itself or to any of the other groups mentioned above by way of bridge members such as —O—, —CH$_2$—,

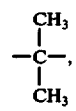

—S—, —SO$_2$— or —CO-groups any may contain ether, ester and acid amide groups. The following groups are particularly preferred:

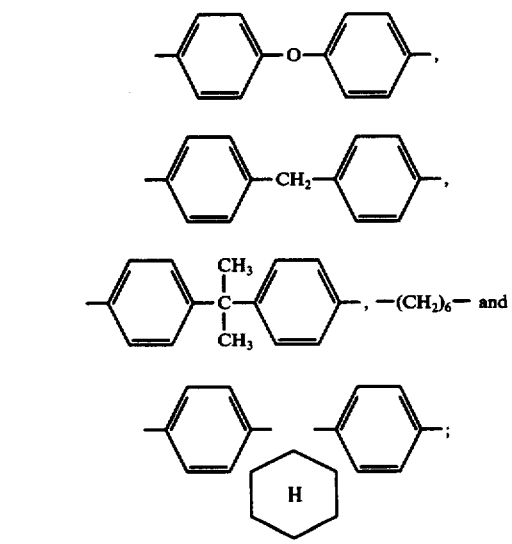

and $R^5$ may represent a bond or have the same meaning as $R^3$ or $R^4$; X and Y which may be the same or different represent groups, such as

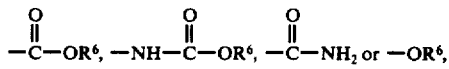

in which $R^6$ = aryl, tolyl, $C_1$ to $C_{12}$ alkyl, $C_1$ to $C_{12}$ hydroxyalkyl or $C_1$ to $C_{12}$ alkoxyalkyl and $n$ = 2 to 200, preferably 2 to 150.

The solvents used for preparing the cyclic polyurea membranes according to the invention are preferably aprotic, highly polar, hydrophilic solvents such as N,N-dimethylformamide; N,N-dimethylacetamide; N,N,N',N'-tetramethylurea; N,N,N',N',N'',N''-hexamethylphosphoric acid triamide; tetramethylenesulphone; dioxane; tetrahydrofuran; diphenylsulphoxide or dimethylsulphoxide. These aprotic, highly polar, hydrophilic solvents may be used either singly or as mixtures with each other or as mixtures with other, less polar solvents, such as benzene, toluene, chlorobenzene, methylene chloride or carbon tetrachloride.

The solutions used for preparing the membranes according to the invention contain 5 to 80 parts by weight, preferably 5 to 30 parts by weight, of cyclic polyurea, and 95 to 20 parts by weight, preferably 95 to 70 parts by weight, of solvent. In addition, they also contain pore forming agents for obtaining highly efficient, semipermeable membrane properties. These pore forming agents are preferably used in such quantities that the solution contains 0.1 to 40 parts by weight, preferably 5 to 30 parts by weight of pore forming agent to 99.9 to 60 parts by weight, preferably 95 to 70 parts by weight of polyurea.

The pore forming agents used may be alkali metal, alkaline earth metal or onium salts, e.g. lithium salts such as lithium chloride and lithium nitrate; calcium salts such as calcium chloride; sodium salts such as sodium chloride and sodium sulphate; ammonium salts such as ammonium chloride and ammonium sulphate; pyridinium salts such as pyridinium chloride and pyridium sulphate or mixtures of such salts.

Lithium chloride and lithium nitrate are particularly preferred pore forming agents.

The membranes according to the invention may be produced by a continuous or discontinuous method, for example in the form of flat membranes. To produce these membranes, the solutions are cast on a substrate which is inert towards the solvent, e.g. a glass, metal, ceramics or synthetic resin substrate, to produce films in thicknesses of 50 $\mu$ to 1 mm, for example, and preferably 100 $\mu$ to 500 $\mu$, employing either a continuous casting process on casting drums or conveyor belts or a discontinuous process using a film carriage. The solvent is then partially removed by exposing it to a stream of air or nitrogen or to reduce pressure for a period of about 30 seconds to 2 hours, preferably 30 seconds to 60 minutes, at temperatures of 20° to 200° C, preferably 30° to 150° C.

The membranes according to the invention can also be produced in the form of hollow fibres from the solution. These hollow fibres can be produced, for example, by means of a spineret described in Belgian Pat. No. 704,360. In this process, the hollow fibres are produced by forcing the solution of cyclic polyureas through the dies of the spineret at temperatures of e.g. between 80° and 200° C, preferably between 100° and 150° C. The hollow fibres are then dried in a stream of nitrogen, for example for 30 seconds to 60 minutes, preferably 5 to 30 minutes, at 20° to 200° C, preferably 30° to 150° C.

The heat of evaporation required for producing the membranes can be supplied by way of the film substrate, the drum or conveyor belt or the stream of air or nitrogen or by a combination of the stream of nitrogen and substrate. The asymmetric structure of the membranes develops during the heat treatment. While still moist, the membranes are then treated with precipitating agents such as water or aliphatic alcohols containing 1 to 6 carbon atoms such as methanol, ethanol, propanol or isopropanol or mixtures of these precipitating agents at temperatures of −30° to 50° C, preferably −15° to 10° C, so that the sol state of the membranes is converted to the gel state and the asymmetric structure of the membranes is strengthened. The membranes are kept in the precipitating bath for a period of between 10 and 60 minutes. Salts and solvents still present in the membranes are dissolved by the precipitating bath and at the same time replaced by the bath so that the membranes are caused to swell and made hydrophilic.

The mechanical stability of the membranes is preferably increased by treating the membranes with water at a temperature of 30° to 80° C, preferably 30° to 60° C for a time of 30 seconds to 10 minutes. The amorphous regions formed in the membrane during its coagulation in the precipitating bath are converted into a higher order state by this thermal after-treatment.

After they have been produced, the membranes are kept in water until required for use.

Asymmetric membranes which are dried in air, under nitrogen or in a vacuum have less permeability to water under conditions of reverse osmosis when remoistened than similar membranes which are constantly kept moist. The advantageous semipermeable separating properties of the asymmetric membrane are evidently irreversibly destroyed by drying.

The finished membrane can be tested at pressures of up to 300 atmospheres, for example in a reverse osmosis apparatus. For this test, the membrane is placed with its inactive side downwards on a filter paper and clamped to a porous metal plate. The salt solution is pumped over the active membrane surface. The desalinated water passing through the membrane is discharged from a tap at the side and its salt content is determined by titration.

The hollow fibre membranes may be used in a permeator described in U.S. Pat. No. 3,339,341.

The membranes according to the invention have good desalinating properties for sea water with high throughflow rates, for example for a 3.5% sodium chloride solution at 130 atmospheres, the membranes have throughflow rates of 30 to 400 l/m² with a salt retention capacity of 94 to 99.99% sodium chloride.

It should be particularly mentioned that the membranes according to the invention have excellent resistance to hydrolysis, for example over a wide pH range of 0 to 9 they show no change in their semipermeable membrane properties. This enables them to be widely used for the purification of effluent water and separation of substances.

The membranes according to the invention are very heat resistant and have excellent mechanical stability. Their membrane properties do not significantly change even under prolonged exposure to pressures of up to 300 atmospheres.

The inventive membranes are therefore advantageously used for the desalination of sea water, brackish water and effluent water, for the separation of substances from solutions and for the concentration of fruit juices according to the principle of reverse osmosis and ultra-filtration, in particular in strongly acid media at pH values of 0 to 4 and at elevated temperatures.

The membranes described in the following Examples were tested in a reverse osmosis apparatus of V4A steel at 130 atmospheres. The membrane was placed on a filter paper with its inactive side downwards on a porous metal filter and clamped into the apparatus. A 3.5% sodium chloride solution was circulated over the active side of the membrane by pumping at a rate of 15 l/hour. The total effective surface area of the membrane for desalination was 44 cm². The desalinated water which passed through the membrane was discharged through a tap at the side and its salt content was determined by titration.

After the test run, the membrane was examined for faults. For this purpose, it was placed on a filter paper, clamped into a suction filter and covered with a 5% aqueous fuchsin solution. The coloured solution was then suction filtered. If the filter paper under the membrane was still colourless after 30 minutes, the membrane was free from faults.

The values given in the examples were determined on membranes which had been tested in the reverse osmosis apparatus for at least 24 hours under the conditions described.

EXAMPLE 1

8 g of the polyhydantoin having a viscosity of 115.720 cP determined of a 15% by weight solution in cresol at 20° C and recurrent structural units of the general formula (A)

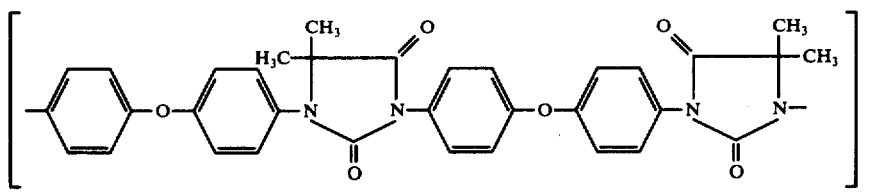

were dissolved in 90 g of a mixture of N-methylpyrrolidone and dimethyl acetamide (1:1), and 1.6 g of lithium chloride were added. The clear solution was filtered through a suction filter and left to stand until it was free from bubbles. Part of this solution was used to draw a film 200 μ in thickness on a glass plate by means of a mechanical film carriage, and the film was then partly dried by placing it on a heating plate in a vigorous stream of nitrogen at 60° C for 10 minutes. After 10 minutes cooling at room temperature, the film was dipped with the glass plate in an ice bath and kept there for 30 minutes. The moist film was then tested in a reverse osmosis apparatus. A 3.5% sodium chloride solution adjusted to pH 7 was found to be desalinated by 99.9% at a throughflow rate of 250 l/m²d and an operating pressure of 130 atmospheres.

EXAMPLE 2

10 g of a polyhydantoin having the structural unit (B) and a viscosity of 40.400 cP, determined of a 15% by weight solution in cresol at 20° C were dissolved in 88 g of N-methylpyrrolidone, and 2 g of lithium chloride were added. A film 200 μ in thickness was cast from the clear solution as described in Example 1 and treated at 100° C for 20 minutes. A 3.5% sodium chloride solution adjusted to pH = 0 with sulphuric acid was found to be desalinated by 99.6% at a throughflow rate through the membrane of 50 l/m²d and an operating pressure of 130 atmospheres.

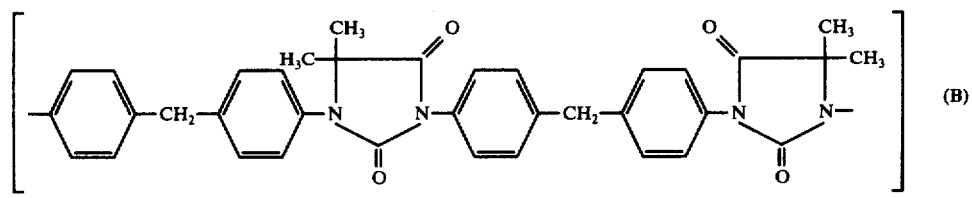

EXAMPLE 3

10 g of a polyhydantoin having the structural unit (C) and a viscosity of 100.289 cP determined of a 25% by weight solution in cresol at 25° C were dissolved in 88 g of N-methylpyrrolidone, and 2 g of lithium chloride were added. A 200 μ film was drawn from the clear solution as in Example 1 and treated at 70° C for 20 minutes. A 3.5% sodium chloride solution adjusted to pH = 1 with sulphuric acid was found to be 99% desalinated by the membrane at a throughflow rate of 30 l/m²d and an operating pressure of 130 atmospheres.

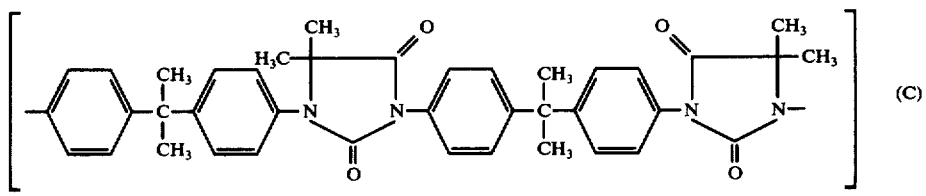

EXAMPLE 4

15 g of a polyhydantoin having the structural unit (D) and a viscosity of 20.502 cP determined as described in Example 1 were dissolved in 82 g of N-methylpyrrolidone, and 3 g of lithium chloride were added. A 300 μ film was drawn from the clear solution as in Example 1 and treated at 90° C for 20 minutes. A 3.5% sodium chloride solution adjusted to pH = 2 with hydrochloric acid was found to be 98% desalinated by the membrane at a throughflow rate of 110 l/m²d.

EXAMPLE 7

10 g of the mixture of 150 g of the polyhydantoin with the structural unit (A) and 15 g of the polyparabanate with the structural unit (G)

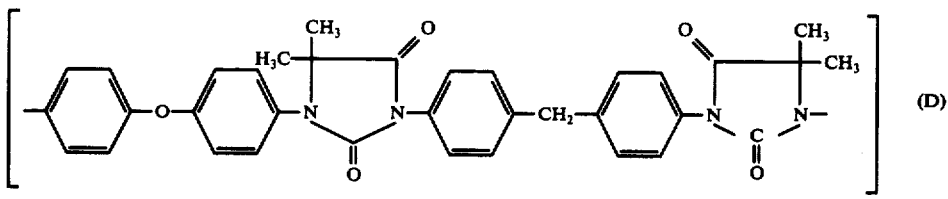

(D)

EXAMPLE 5

15 g of a polyhydantoin having the structural unit (E) and a viscosity of 45.194 cP determined as described in Example 1 were dissolved in 82 g of N-methylpyrrolidone, and 3 g of lithium chloride were added. A 300 μ film was drawn from the solution as in Example 1 and treated at 70° C for 20 minutes. A 3.5% sodium chloride solution adjusted to pH = 1 with hydrochloric acid was found to be 97.5% desalinated by the membrane at a throughflow rate of 90 l/m²d.

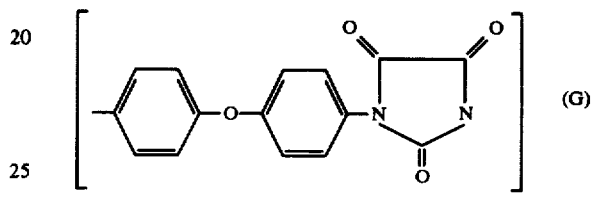

(G)

are dissolved in 88 g of N-methylpyrrolidone, and 2 g. of lithium chloride were added. A 300 μ film was drawn from the solution as in Example 1 and treated at 80° C

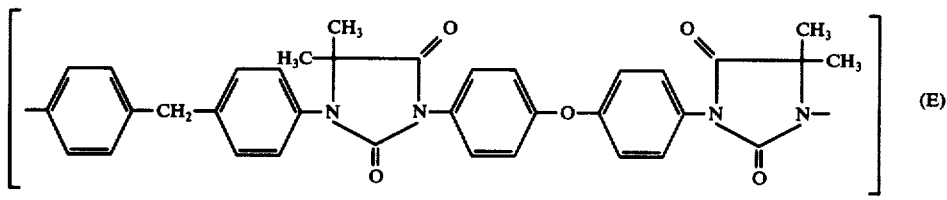

(E)

EXAMPLE 6

15 g of a polyhydantoin having the structural unit (F) and a viscosity of 60.333 cP determined as described in Example 1 were dissolved in 82 g of N-methylpyrrolidone, and 3 g of lithium chloride were added. A film 300 μ in thickness was drawn from the solution as in Example 1 and treated at 100° C for 20 minutes. A 3.5% sodium chloride solution adjusted to pH = 0 with sulphuric acid was found to be 99.1% desalinated by the membrane at a throughflow rate of 70 l/m²d.

for 20 minutes. A 3.5% sodium chloride solution adjusted to pH 7 was found to be 99.2% desalinated by the membrane at a throughflow rate of 130 l/m²d and at an operating pressure of 130 atmospheres.

EXAMPLE 8

15 g of the polyhydantoin having the structural unit (H) and a viscosity of 20.300 cP determined as described in Example 1 were dissolved in 83 g of N-methylpyrrolidone, and 2 g of lithium chloride were added. A film 200 μ in thickness was drawn from the solution as in Example 1 and treated at 90° C for 10 minutes. A 3.5% sodium chloride solution adjusted to pH = 4 with hydrochloric acid was found to be 98.5% desalinated by the membrane at a throughflow rate of 90 l/m²d and an operating pressure of 130 atmospheres.

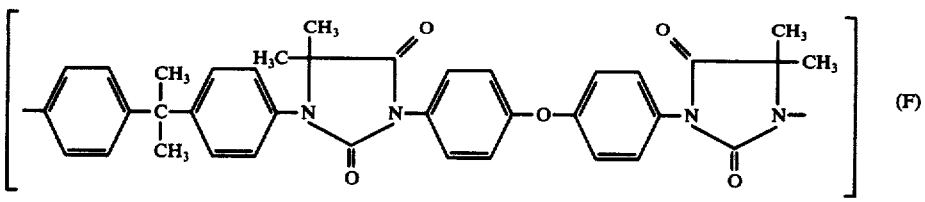

(F)

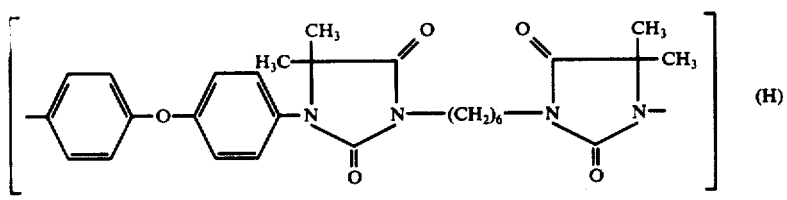

EXAMPLE 9

10 g of a polyhydantoin of the general formula (I)

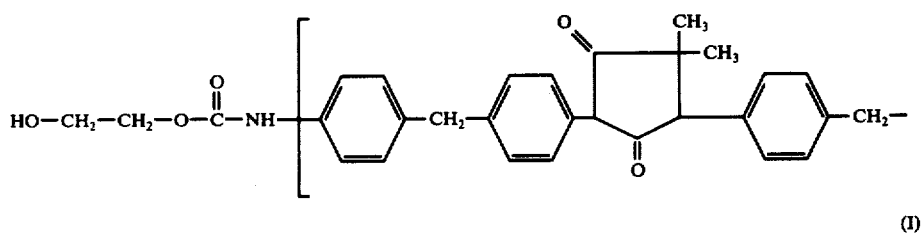

were dissolved in 89 g of N-methylpyrrolidone, and 1 g of lithium chloride was added. A 400 μ film was drawn from the solution as in Example 1 and treated at 70° C for 30 minutes. A 3.5% sodium chloride solution adjusted to pH 7 was found to be 99.2% desalinated at a throughflow rate of 110 l/m²d and an operating pressure of 130 atmospheres.

EXAMPLE 10

10 g of a polyparabanate having the structural unit (G)

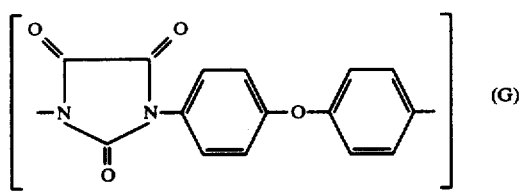

and a viscosity of 1.029 cP determined of a 10% solution in dimethylformamide at 20° C, were dissolved in 88 g of N-methylpyrrolidone, and 2 g of lithium chloride were added. A 300 μ film was drawn from the solution as in Example 1 and treated at 70° C for 30 minutes. A 3.5% sodium chloride solution adjusted to pH 1 with hydrochloric acid was found to be 99.6% desalination by the membrane at a throughflow rate of 400 l/m²d and at an operating pressure of 130 atmospheres.

EXAMPLE 11

10 g of a polyparabanate having the structural unit (L) and a viscosity of 500 cP determined as described in Example 10, were dissolved in 88 g of a mixture of N-methylpyrrolidone and dimethylacetamide (1:1), and 2 g of lithium chloride were added. A 300 μ film was drawn from the solution as in Example 1 and treated at 80° C for 20 minutes. A 3.5% sodium chloride solution adjusted to pH = 3 with hydrochloric acid was found to be 99% desalinated by the membrane at a throughflow rate of 250 l/m²d at 130 atmospheres.

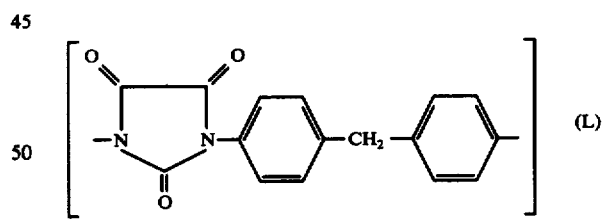

We claim:

1. An asymmetric semipermeable membrane of a cyclic polyurea selected from the group consisting of a polyhydantoin of the formula

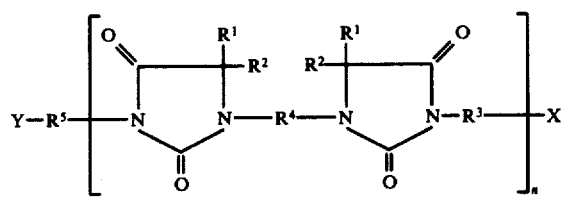

and a polyparabanate of the formula

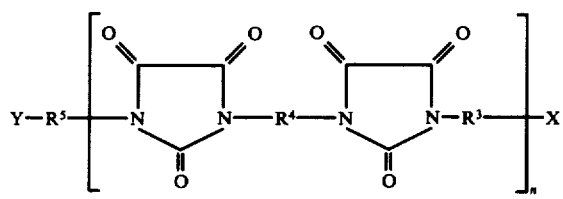

wherein $R^1$ and $R^2$, when taken separately, are each selected from the group consisting of hydrogen, $C_1$ to $C_6$ alkyl and $C_3$ to $C_6$ cycloalkyl; $R^1$ and $R^2$, when taken together with the carbon atom to which they are attached, are cycloalkyl having 5 to 10 carbon atoms; $R^3$ and $R^4$ are each selected from the group consisting of $C_1$ to $C_{12}$ alkylene, $C_3$ to $C_6$ cycloalkylene, arylene and any two of the aforesaid members defining $R^3$ and $R^4$ connected together by a member selected from the group consisting of —O—, —CH$_2$,

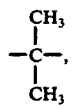

—S—, —SO$_2$— and —CO—; $R^5$ is selected from the group consisting of a bond and the members of the group defining each of $R^3$ and $R^4$; X and Y are each selected from the group consisting of a bond,

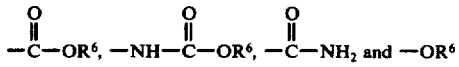

wherein $R^6$ is selected from the group consisting of aryl, $C_1$ to $C_{12}$ hydroxyalkyl and $C_1$ to $C_{12}$ alkoxyalkyl and $n$ is an integer from 2 to 200.

2. A membrane as claimed in claim 1 wherein $n$ is an integer of from 2 to 150.

3. A membrane as claimed in claim 1, in which the cyclic polyurea is said polyhydantoin.

4. A membrane as claimed in claim 1, in which the cyclic polyurea is said polyparabanate.

5. A process for the desalination of water, which comprises passing the water through a membrane as claimed in claim 1.

6. A process as claimed in claim 5, wherein the desalination takes place at pressures of up to 300 atmospheres.

7. A process for the separation or concentration of substance mixtures which comprises passing the mixtures through a membrane as claimed in claim 1.

8. A process as claimed in claim 7, wherein the mixtures have a pH value of from 0 to 4.

9. A process as claimed in claim 7, wherein the concentration or separation takes place at elevated temperatures.

* * * * *